Oct. 27, 1959 — E. W. GOLDBERG — 2,909,962
SLIDE CHANGER WITH ANGLED MAGAZINE
Filed Jan. 7, 1955 — 3 Sheets-Sheet 1

Inventor:
Ernest W. Goldberg
By [signature] Atty.

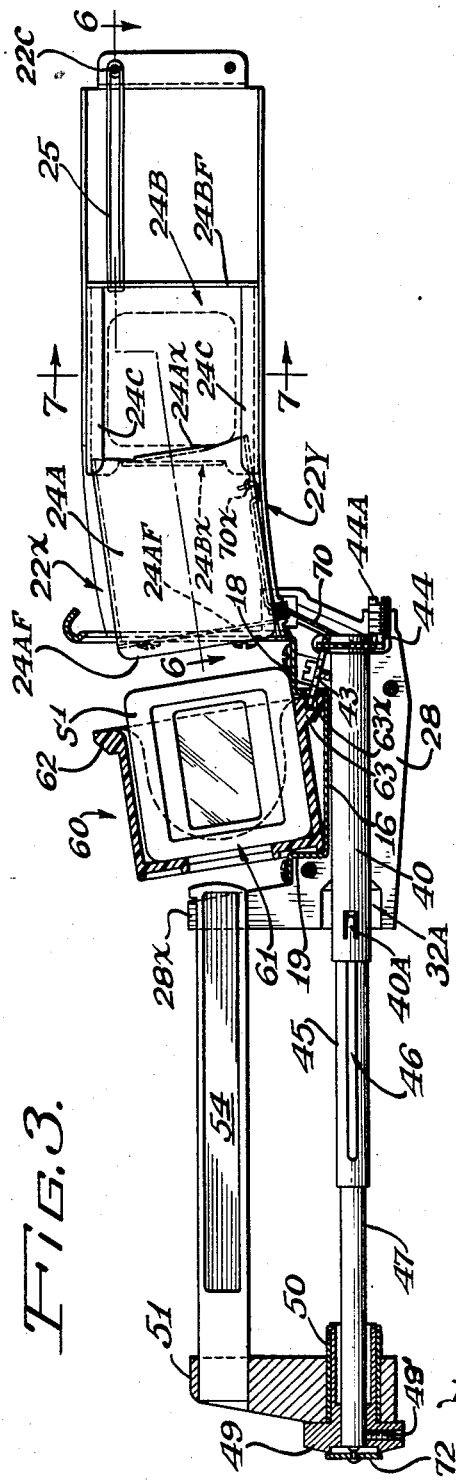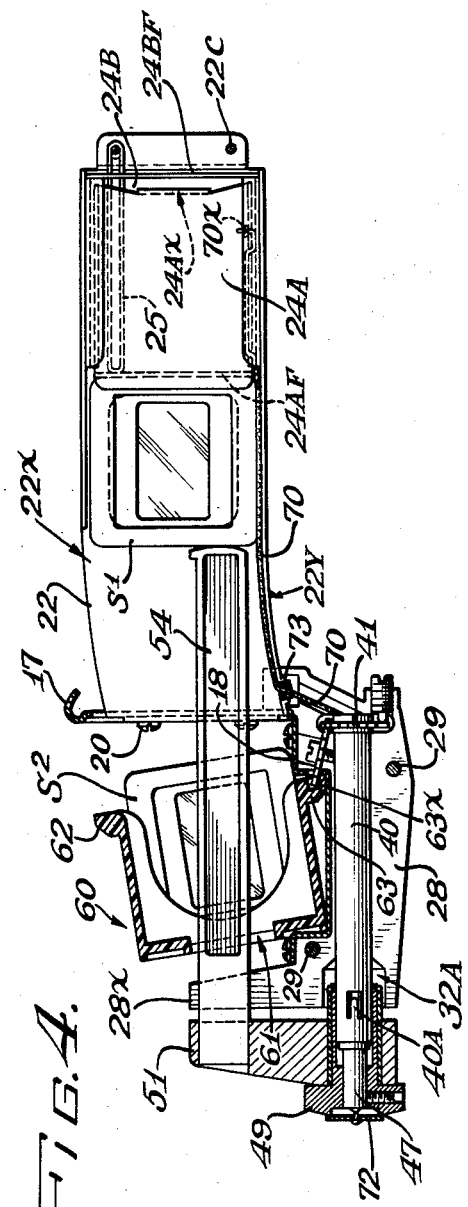

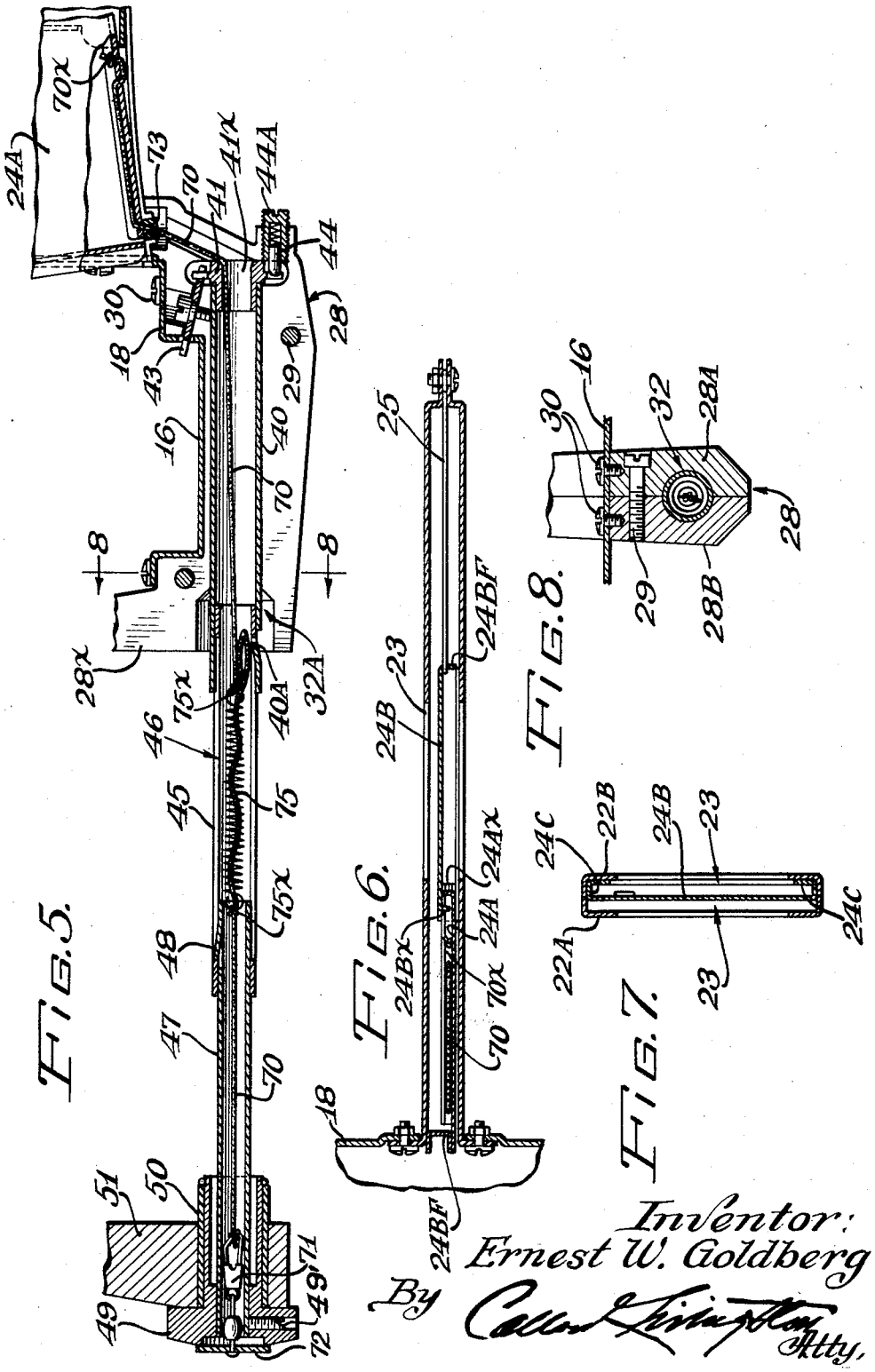

United States Patent Office 2,909,962
Patented Oct. 27, 1959

2,909,962

SLIDE CHANGER WITH ANGLED MAGAZINE

Ernest W. Goldberg, Wilmette, Ill.

Application January 7, 1955, Serial No. 480,383

1 Claim. (Cl. 88—28)

This invention pertains to slide projectors of the automatic or magazine type, and has as its principal object the provision of improvements in slide-changing mechanism including an improved bed for the slide magazine with angular positioning of the latter, and a reciprocatory, telescoping, slide-transferring stroke arm mechanism having positive connection with a shutter means for actuating the latter responsive to reciprocations of the stroke-arm mechanism, with an independent rotary motion and pinion means actuated thereby for imparting step-by-step movement to the slide magazine.

One of the features of the improved slide changer is the combination of a slide magazine having a flange formation which sets it at an angle in its bed so that the slides tend to remain back in their compartments at all times notwithstanding reasonable jarring of the apparatus and travel of the magazine itself.

Another feature is the provision of guiding and positioning flange means in the magazine bed, together with an angled positioning of the magazine driving pinion, such that the angularly resting magazine may be deposited in the bed, or removed therefrom at will and need not be started in any particular position nor moved to the end of its run for insertion or removal.

A further feature is the provision of a positive but yieldable connection between a shutter means and the slide-moving stroke arm which avoids damage in the event of jamming of a slide, and also affords a form of snap-action in the ejection of the slide from the display channel back into the magazine which, together with the angled attitude of the latter, assures positive return of the slides to their compartments without concern for any precise withdrawal of the stroke arm to the absolute limits of its travel.

A further object is the provision of an open magazine bed into which the slide magazine or box may be deposited directly from the top, side, or ends, at any slide position, together with a magazine having a longitudinal but a laterally-protruding flange along at least one of the margins of its open top, this flange having a top face substantially flush with the plane of the open top of the box and having a rack of gear teeth in said face, the box lying on its side in said bed and there being a stepping pinion at one side of the bed in position to engage in said gear teeth when the box is placed in the bed with said flange juxtaposed thereto, said flange protruding sufficiently in the lateral sense to tilt the box about 5° in the bed with its open top facing in an upward direction so that the slides tend to normally gravitate back into the box.

Additional objects and aspects of novelty and utility relate to details of the construction and operation of the embodiment described hereinafter in view of the annexed drawings, in which:

Fig. 3 is a front elevational view of the slide-changing unit with parts shown in section as seen in the direction of lines 3—3 of Fig. 2, and the stroke arm withdrawn in slide-return condition;

Fig. 4 is a view similar to Fig. 3 but with the stroke arm shown in slide-advancing condition;

Fig. 5 is a fragmentary sectional detail to enlarged scale of the telescoping stroke-arm, magazine-advancing pinion means, and the angular-seating magazine bed;

Fig. 6 is a fragmentary horizontal sectional detail taken along lines 6—6 of Fig. 3, through the slide channel;

Fig. 7 is a vertical section through the slide channel as seen along lines 7—7 of Fig. 3;

Fig. 8 is a fragmentary sectional detail taken through the stroke-arm bracket-casting as seen in the direction of lines 8—8 of Fig. 5.

Figure 1:
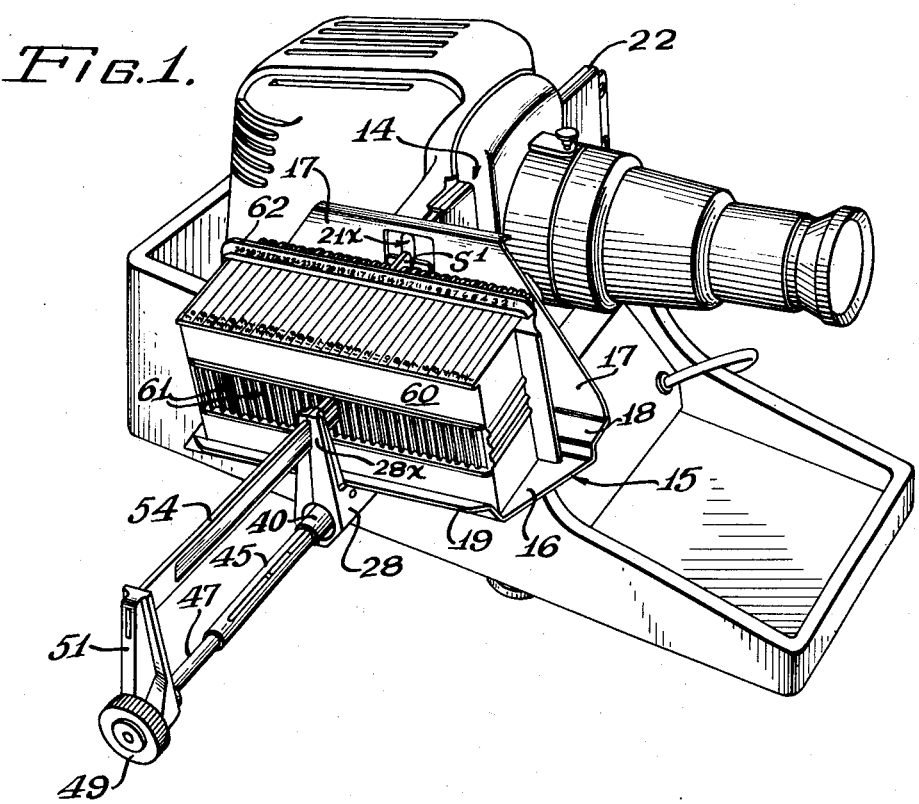
Fig. 1 is a perspective view of a projector and the improved automatic slide-changing mechanism in operative position thereon.
Figure 2:
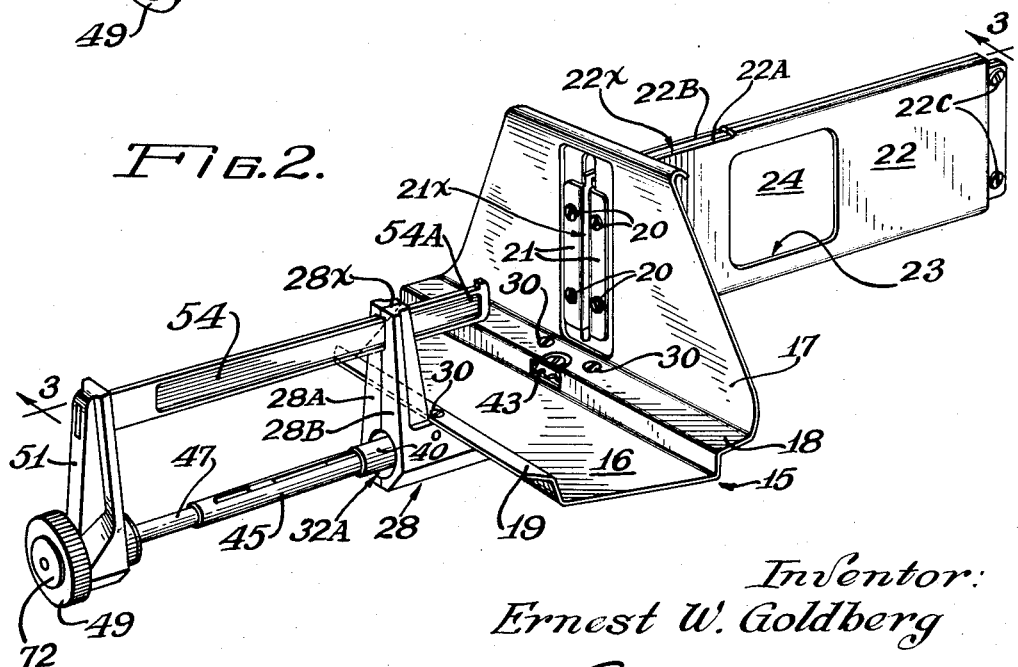
Fig. 2 is a perspective view of the slide-changing mechanism detached from the projector.

The improved slide changing mechanism shown in Fig. 2 is fabricated as a separate unit from the projector with which it is to be assembled, as in Fig. 1, by insertion into the slide seat 14 thereof.

Referring to Fig. 2, the slide-changing unit consists of a magazine bed 15 comprising a bottom channel 16, an upstanding apron 17, an integral tilting ledge 18 interposed between the apron and channel, and an outer guard flange 19 on the channel.

Secured to the apron by screws 20 in wings 21 is the horizontally-extending slide channel 22 having a central projection window 23 before which the slide $S^2$ will be positioned (as in Fig. 4). Normally, this window is closed by a composite metal blinder or shutter means 24 (Fig. 4).

Carried on the underside of the magazine bed is a bracket casting 28 consisting of two split sections 28A and 28B (Figs. 2 and 3), secured together by screws 29 and fastened to the bed plate by screws 30, as shown to advantage in Figs. 5 and 8, the latter view also showing the horizontal bore 32 into which certain telescoping operating members can be disposed in the manner shown in Fig. 4, there being an enlarged outer mouth 32A for this bore, as seen in Fig. 2, the purpose of which will appear.

The slide channel 22 (Figs. 2 and 7) is preferably constructed of a pair of mating sheet-metal stampings 22A and 22B secured together at their inner ends at the apron 17 by the wing screws 20, and at their outer ends by screws 22C (Fig. 2).

The shutter means 24 slideable therein consists of a pair of relatively shiftable metal plates 24A, 24B (Fig. 3), the latter having its upper and lower edge portions turned over to provide grooves 24C (Fig. 7) in which similar upturned margins of the companion plate 24A are slideably seated in the manner depicted in Fig. 3. One vertical edge portion of each shutter plate has an offset stop lug 24AX or 24BX engageable with the other lug to limit the opening or extensive motion of one plate relative to the other and couple the plates at times, as in Fig. 3. Moreover, the leading edge of the plate 24A is offset to provide a vertical slide-engaging flange 24AF against which the entering edge of the slide bears (as in Fig. 4).

Anchored on one of the screws 22C (Fig. 3) is a spring wire 25 looped through holes in an upset rear flange 24BF on the plate 24B and serving as a presser means to prevent undue looseness of this plate in the channel and to limit the travel thereof to the position shown in Fig. 3, this spring acting also on the sides of the pair of plates in the folded condition of Fig. 4 to prevent undue looseness.

About two-thirds of the way along its length from the outer end thereof, the slide channel turns down as at 22Y to the level of the ledge 18 in the magazine bed, and the top edge portions of the slide channel are left open as at 22X in Figs. 2, 3, and 4, in order to eliminate any obstruction to the upper corners and edge portions of the shutter plate 24A as well as the slides, since the latter change direction somewhat at the point of inflection 22Y in entering or leaving the channel.

Referring to Fig. 3, the telescoping stroke-arm mechanism comprises a first tube 40 seated in the bore of the bracket casting 28 and having affixed to one inner end thereof a driving pinion 41 (Fig. 5, also), the opposite or outer end of this tube projecting beyond the widened mouth 32A of said bore.

Seated in a cavity formed in the bracket casting 28 is a driven pinion 43 the teeth of which protrude through the ledge 18 into the magazine bed, as shown in Fig. 2, where they can enter the teeth of the gear rack 63X moulded into one of the edge flanges 63 of the slide magazine 60.

Fitting slideably into the first tube 40 is a smaller second tube 45 having along its side a keying slot 46 (Fig. 3), into which projects a spring detent 40A on the first tube, so that both tubes are coupled for rotary motion, yet the second can slide in the first.

A third tube 47 telescopes into the second tube, to which it is also keyed by means of a spring detent 48 (Figs. 3 and 5) also working in said long slot.

Secured to the outer end of the third tube by set screw 49' is a knob 49 which turns in a sleeve 50 fitted into an upright post casting 51 (Figs. 3 and 5). By turning this knob, the three tubes 40, 45, 47, and the pinions 41 and 43 are also turned, there being a spring-urged detent 44 (Fig. 5) removably set into the end of the bracket 28 by screw 44A and working in the teeth of the driving pinion 41 as a click-stop so that the magazine tray can be advanced one compartment at a step.

Rigidly secured in the post 51 is a pusher or stroke arm 54 having sliding support at its opposite end in another post member 28X which is formed integrally with the bracket castings 28A, 28B.

The free end 54A of the stroke arm is thus aligned with the entrance slot 21X to the slide channel 22 (Fig. 2) formed between its wings 21, and can enter to the depth shown in Fig. 4 when the knob 49 and the appertaining set of tubes is pushed to the limit inwardly, it being noted that the enlarged mouth at 32A accommodates the knob sleeve 50 in this action.

In Fig. 1, a magazine tray 60 is shown positioned on its side in the bed 15 resting on plate portion 16, and this tray has a series of openings 61 in its bottom and each aligned with a slide compartment containing one of the slides, such as S¹, S² in Figs. 3 and 4; and when the stroke arm is pushed inwardly the end 54A enters the aligned bottom opening 61 in the magazine and pushes the appertaining slide, say S¹, into the channel entrance where it first encounters the flange 24AF on the leading edge of the shutter means, thereafter pushing the shutter section 24A inwardly until its stop lug 24AX abuts the back flange 24BF on the companion shutter plate, whereupon the latter also begins to move out of obstructing position before the projection window 23 into the condition depicted in Fig. 4, wherein it is seen that the two shutter plates are in effect folded together and the slide S¹ stands in display position before said window.

When it is desired to return the slide to the magazine the motion of the stroke-arm mechanism is reversed to retract the section 54, and the shutter means is returned through a positive connection with the knob 49, which connection comprises a tough synthetic cord 70 within the telescoping tube assembly (Fig. 5), attached at one end to a swivel pin 71 which, in turn, is loosely engaged with the knob by means of a plug 72 seating lightly in a bore in said knob.

The opposite end of the cord 70 passes through an axial opening 41X in the drive pinion 41, thence upwardly through a bearing grommet 73, along the inside of the bottom flange on the shutter plate 24A toward the rear (righthand) port thereof, and is affixed by knotting the end of the cord through holes in said bottom flange of that shutter plate 24A, as at 70X (Figs. 3 and 5).

Automatic take-up means for slack in the cord 70 includes a coil spring 75 (Fig. 5) within the telescoping tubes and having its opposite ends secured to the cord by knots, as at 75X, there being a substantial looseness in the intervening length of cord within the spring, that is to say, the length of cord 70 which is connected to the ends of the spring is substantially longer than the spring itself, when relaxed or closed up.

The spring take-up means 75, 75X is a safety device for preventing injury to the cord and shutter means should the latter become jammed owing to faulty movement or dimensions of a slide for any reason. Moreover, the spring 75 gives a snap-action to the return of the slide, which is useful in conjunction with the angled attitude of the slide tray or magazine in the bed, as will shortly appear.

When the stroke-arm is retracted to return a slide to the magazine there is sufficient resistance from the slide itself and the shutter means to cause the spring 75 to stretch more or less depending on the magnitude of resistance. But in any case, the pull on the cord 70 and hence on the leading shutter plate 24A eventually starts the latter moving toward the left (Fig. 4) and pushes the slide S¹ back toward the magazine. Meanwhile, the leading shutter section 24A will soon pick up the following section 24B and pull the latter closed because of engagement of the stop lugs 24AX, 24BX.

As the returning slide enters the downgrade area beneath the cut-away 22X and above the point of inflection 22Y, the motion of the slide is accelerated by the independent pull of stretched, and the slide moves briskly back into its magazine compartment with a sort of snap action which is greatly aided by the angled position of the magazine, as depicted especially in Figs. 3 and 4.

The magazine tray 60, as shown in Fig. 1, is more fully described and claimed in my copending application, Serial No. 208,402, filed January 29, 1951, but as viewed in cross-section in present Figs. 3 and 4, it will be observed that the upper longitudinal margins of the tray are bordered lengthwise by outwardly-projecting flanges 62 and 63, the latter having moulded as part thereof along its length, a series or rack of gear teeth 63X interfitting with the feed pinion 43 heretofore described.

By reason of the laterally-outward projection of the flange 63 beyond the outside face of the appertaining sidewall of the box or tray, the latter is constrained to lie at an angle on bed plate 16 between the guard flange 19 and the ledge 18. This angle tends to maintain the slides by gravity in their respective compartments, notwithstanding jiggling of the machine in the course of operation, and thus eliminates a source of trouble encountered in other types of projector which do not provide some means for preventing slides from creeping slightly out of the tray and jamming the advance of the magazine.

Another important advantage of the angled magazine and slide channel lies in the final acceleration which the returning slide tends to acquire as it starts downgrade out of the channel and into the magazine, this effect being due to the effect of gravity and a suddenly lessened resistance to the travel of the slide on the one hand, and to the tensioned condition of the spring 75, on the other hand.

In consequence, the operator need not be too concerned with pulling the stroke-arm fully back to home position before turning the knob 49 to advance the magazine to the next slide compartment, for the snap-action discharge of the slide tends to seat it quickly and positively in its compartment even when the stroke arm is not pulled out to the fullest possible limit, it being understood, nevertheless, that the pusher arm 54 must obviously be retracted far enough to clear the magazine itself before the latter can be advanced as aforesaid.

Another great advantage of the angled magazine feature aforesaid is the fact that the magazine tray 60 can be inserted in the bed 15 or removed therefrom regardless of any starting or ending position with respect to its travel in the bed. In other words, it is not necessary to start the travel of the magazine from the No. 1 compartment or move it the whole length to the last compartment before removal, as is the case with some types of automatic changer, and in this connection, such optional placement of the magazine is possible because of the angled attitude of the drive pinion 43 and the outward-projection of the magazine flange 63 and disposition of the gear rack therein relative to the pinion. Nevertheless, the two bed flanges 18 and 19, rising as they do above the level of the bed plate 16, removably maintain the magazine in proper operating relation to said pinion 43, but safeguarded against reasonable or ordinary jarring, while at the same time permitting the operator to pick up the magazine at any time by simply rocking it (clockwise, Figs. 3 and 4) slightly about the flange 63 as a pivot point, until the bottom edge of the magazine is free of the guard flange 19 and can be withdrawn from engagement with the pinion 43.

I claim:

In a slide changer, the combination comprising a slide magazine in the form of a generally rectangular elongated tray for receiving a plurality of slides on edge, said tray having rectangularly related side and end walls together with a bottom wall having aperture means therein opposite the slides, said magazine having an open top opposite said bottom wall, a magazine bed member having a substantially horizontal channel extending from front to rear therein for receiving said magazine with said magazine turned over on one of its side walls, the open top of said magazine thereby facing generally in a lateral direction, said channel having a bottom wall for supporting said magazine and opposite upwardly extending side walls for guiding said magazine for forward and rearward movement along said channel, a hollow, generally rectangular slide-guiding member secured to said bed for receiving the slides one at a time from said magazine, said slide-guiding member being generally tubular and rectangular in cross section and having front, rear, top and bottom walls, said front and rear walls having aligned projection openings formed therein at an intermediate point along the length of slide-guiding member, said slide-guiding member being positioned in a plane substantially at right angles to said magazine bed member and extending laterally and generally in a horizontal direction therefrom, said slide-guiding member having an inner open end adjacent said magazine bed member for receiving the slides from the magazine, shutter plate means movable within said slide-guiding member along the length thereof and adapted to close said projection openings, an elongated generally horizontal push bar movable through said aperture means in the bottom wall of said magazine for pushing the slides one at a time into the open end of said slide-guiding member into alignment with said projection openings, said shutter plate means being engageable edgewise by the slide and thereby being movable outwardly in said slide-guiding member to uncover said projection openings, a hollow tubular telescopically extensible and retractable support member extending generally in a horizontal direction under said magazine bed member and in a plane substantially at right angles thereto, said push bar being generally parallel to said support member, a generally vertical bar mounting the outer end of said push bar on the outer end of said support member for supporting said push bar for substantially horizontal movement generally along its own longitudinal axis, a flexible tension member having one end connected to the outer end of said telescopically extensible and retractable support member and the other end connected to said shutter plate means, said tension member extending within said support member along the length thereof for returning said shutter plate means into position over said projection openings in response to outward movement of said support member and said push bar, said shutter plate means being effective to return the slide along said slide-guiding member to said magazine, said flexible tension member having an extensible spring connected into a portion of the length thereof for yielding upon outward movement of said support member if resistance is encountered in the return movement of said shutter plate means, means operable by said support member for stepping said magazine along said channel of said magazine bed member, said slide-guiding member having a horizontal portion adjacent said projection openings but having a sloping portion slanting downwardly at a small angle between said projection openings and said open inner end of said slide-guiding member for returning the slide to the magazine with the assistance of gravity, said magazine having lateral flange means thereon along said open top for tilting said magazine in said magazine bed channel so that said open top of said magazine will face upwardly as well as laterally toward said open end of said slide-guiding member at a slope angle corresponding to the angle of said sloping portion of said slide-guiding member.

References Cited in the file of this patent

UNITED STATES PATENTS

| 695,548 | Fredrick | Mar. 18, 1902 |
| 2,427,164 | Stechbart | Sept. 9, 1947 |
| 2,590,492 | Bennett et al. | Mar. 25, 1952 |
| 2,711,602 | Wiklund | June 28, 1955 |
| 2,724,989 | Badalich | Nov. 29, 1955 |

FOREIGN PATENTS

| 20,346 | Great Britain | of 1896 |